DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 23

T881,010
PHOTOGRAPHIC FILM UNIT FOR DIFFUSION TRANSFER PROCESSING

Harold E. Cole, 8 Cottonwood Lane, Pittsford, N.Y. 14534

Filed May 25, 1970, Ser. No. 40,438
**Int. Cl. G03c *1/48***
U.S. Cl. 96—76
No Drawing. 16 Pages Specification

Color diffusion transfer photosensitive elements and film units are disclosed which are adapted for one-step processing. The photosensitive element comprises a transparent support coated with an image-receiving layer, an opaque reflecting layer and at least one, and preferably three, silver halide emulsion layers having associated therewith a dye image-providing material, preferably a dye developer. After exposure of the photosensitive element, an opaque process sheet containing an alkaline processing composition, preferably imbided in the sheet in liquid form, is laminated to the photosensitive element as it is withdrawn from the camera. Alternately, the opaque process sheet may contain the processing composition in dry form, e.g., a layer of an alkali source such as sodium carbonate overcoated with pressure-sensitive microcapsules of water. The processing composition develops the exposed silver halide emulsion layers and dye images are formed as a function of development which diffuse to the image-receiving layer to provide a positive, right-reading image which is viewed through the transparent support on the opaque reflecting layer background. Developing agents may be present in the processing composition or incorporated in the process sheet or photosensitive element.